United States Patent [19]

Mueller

[11] Patent Number: 5,602,917
[45] Date of Patent: Feb. 11, 1997

[54] METHOD FOR SECURE SESSION KEY GENERATION

[75] Inventor: Kurt H. Mueller, Wallisellen, Switzerland

[73] Assignee: Lucent Technologies Inc., Murray Hill, N.J.

[21] Appl. No.: 366,863

[22] Filed: Dec. 30, 1994

[51] Int. Cl.$^6$ ............................... H04L 9/08; H04L 9/00
[52] U.S. Cl. ........................... 380/21; 380/9; 380/44; 380/46; 380/49
[58] Field of Search ........................ 380/2, 9, 21, 28, 380/49, 29, 44, 46

[56] References Cited

U.S. PATENT DOCUMENTS

| | | | |
|---|---|---|---|
| 4,649,233 | 3/1987 | Bass et al. ................................. | 380/21 |
| 5,241,599 | 8/1993 | Bellovin et al. ........................ | 380/21 |

OTHER PUBLICATIONS

B. Schneier, *Applied Cryptography*, John Wiley & Sons, New York, 1994, Chapter 16, "Special Algorithms for Protocols," pp. 376–393.

Primary Examiner—Bernarr E. Gregory

[57] ABSTRACT

A symmetric procedure avoids the problems with prior art systems using modifiers with master keys and generates a secure session key from a secret master key and an additional pair of randomly selected signals. The secret master key is known to both parties: one at station A and one at station B. One randomly selected signal of the pair is generated by the party at station A while the other signal in the pair is generated by the party at station B. In one embodiment, a random number signal sent by each one of the parties to the other is encrypted before transmission and decrypted upon reception. Both encryption (at one station) and decryption (at the other station) employ symmetric key cryptographic systems which use the secret master key. The session key is then formed by a commutative combination of both random number signals.

15 Claims, 2 Drawing Sheets

METHOD FOR SECURE SESSION KEY GENERATION

TECHNICAL FIELD

This invention relates to a method for generating keys for encryption systems and, more particularly, for generating secure session keys for such systems.

BACKGROUND OF THE INVENTION

Changing encryption keys after a certain usage time is an old concept. For example, in the initial key distribution process, an entire table of encryption keys is distributed. Thereafter, each key is used for a specific time only. Alternatively, a new key can be derived for each session by using mathematical one-way functions such as is done in the Diffie-Hellman algorithm. Finally, with a distributed master key and a series of modifier elements such as a date or time stamp or a counter or the like, one can combine the master key with the modifier elements to generate session keys as needed.

Each of the aforementioned techniques for session key generation suffers from a variety of factors which detract from the appeal of the technique. The first technique requires a fairly large protected memory to store the table of keys. In addition, it requires a significant amount of physical security to keep it from being compromised. The second technique using one-way functions requires powerful processors to compute functions such as discrete logarithms. It also requires a validation of each new key which is generated for the particular session to defy the so-called "person in the middle" attack. The third technique is the most advantageous of the three mentioned. However, if the requirement of unique session keys is imposed, it then becomes necessary for the modifier elements to have a sufficiently long length that maintains an acceptably low probability of repetition. Where data and/or time stamps are used, there are potential security and operational problems arising from clock alignment problems or in allowing communication across different time zones.

SUMMARY OF THE INVENTION

A symmetric procedure avoids the problems with prior art systems using modifiers with master keys and generates a secure session key from a secret master key and an additional pair of randomly selected signals. The secret master key is known to both parties: one at station A and one at station B. One randomly selected signal of the pair is generated by the party at station A while the other signal in the pair is generated by the party at station B.

In one embodiment, a random number signal sent by each one of the parties to the other is encrypted before transmission and decrypted upon reception. Both encryption (at one station) and decryption (at the other station) employ symmetric key cryptographic systems which use the secret master key. The session key is then formed by a commutative combination of both random number signals.

In another embodiment, random number signals are sent by each party to the other. Both random number signals are individually decrypted at each station by using symmetric key cryptosystems which employ the secret master key. The session key is then formed by a commutative combination of both decrypted random number signals.

These secure session key generation methods offer the distinct advantage that intercepted, encrypted messages based on the session key cannot be decrypted at a later time even if access to the actual encryption system is gained. Moreover, these methods do not require high speed encryption procedures or special record keeping functions generally associated with other session key generation methods.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

It is appropriate to provide some cryptology nomenclature at this time. A puzzle can be thought of as a locked box containing a message where the box is secured by a combination lock. Only a bona fide user can probably solve the puzzle. A class of puzzles is known as a cryptographic system or cryptosystem. The process of making a puzzle is known as encryption and the process of solving the puzzle is known as decryption. The puzzle is called ciphertext and the message within the puzzle is called plaintext. The members of a particular cryptosystem are distinguished by a particular key or cryptographic key.

The key to making a specific puzzle (i.e., locking plaintext into ciphertext) is known as the encryption key. Similarly, the key to solving a puzzle (i.e., recovering the plaintext from the ciphertext) is known as the decryption key. According to the scheme of a particular cryptosystem, a key is used to lock plaintext into ciphertext and that same key can also be used to unlock the ciphertext to retrieve the plaintext. When the encryption key and the decryption key are identical, the cryptosystem is known as a symmetric key cryptosystem.

The notation $E(K_M, R_A)$ is the encryption of the signal $R_A$ via the symmetric key cryptosystem using master key $K_M$. Also, the notation $D(K_M, R_A)$ is the decryption of the signal $R_A$ via the symmetric key cryptosystem using master key $K_M$.

Figure 1:
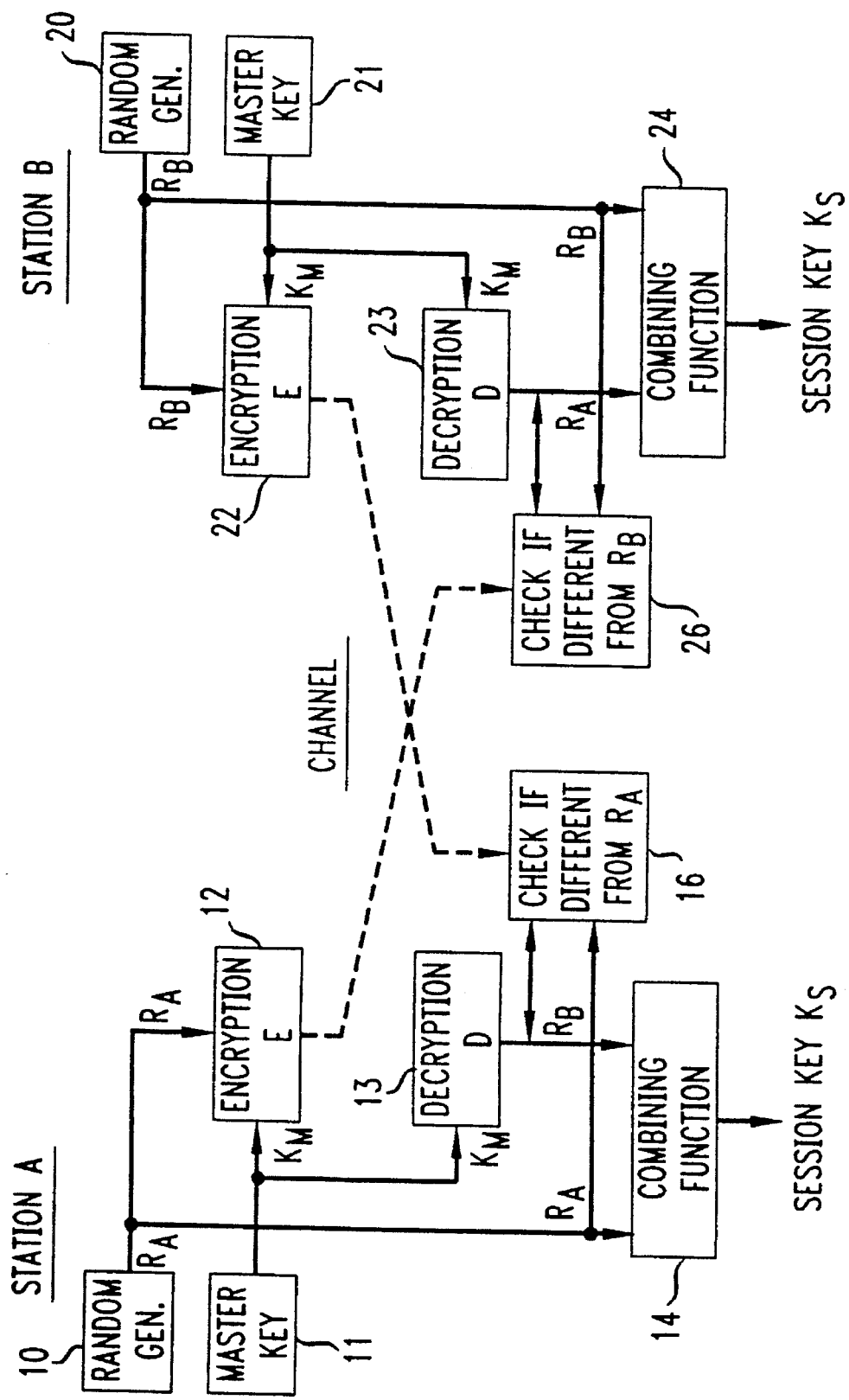
FIGS. 1 and 2 are illustrative embodiments of a secure session key generation system realized in accordance with the principles of the present invention.

FIG. 1 shows a secure session key generation system realized in accordance with the principles of the present invention. A session key $K_S$ is generated mutually and simultaneously at each of two communicating stations, namely station A and station B. Both stations communicate with each other over an insecure communication channel shown by the dashed lines. Session key generation at station A is substantially identical to the session key generation at station B.

The session key generation apparatus at station A includes random number generation element 10, master key element 11, encryption element 12, decryption element 13, combining element 14 and comparison element 16. Similarly, the session key generation apparatus at station B includes random number generation element 20, master key element 21, encryption element 22, decryption element 23, combining element 24 and comparison element 26. Since each station's apparatus is symmetric with that of the other station only station A will be described in detail.

Random number generation element 10 generates a random or pseudo-random sequence of bits as a random number signal $R_A$. Signal $R_A$ is supplied to encryption element 12 and combining element 14.

Master key element 11 stores the master key $K_M$ negotiated at some earlier time between stations A and B or distributed to stations A and B by a key distribution center. That is, both stations A and B have identical master keys. The master key $K_M$ is expected to be used over a very long period of time in comparison with the time of use for a session key. Master keys span many sessions or transactions whereas a session key is generally used for a single session or transaction. Master keys can be distributed by couriers or tokens or they can be generated by Diffie-Hellman key exchange or the like.

Encryption element 12 performs the encryption $E(K_M,R_A)$ using the master key $K_M$ and generates a ciphertext of $R_A$ which is transmitted as an outgoing signal to the partner station B. Decryption element 13 receives an incoming signal $E(K_M,R_B)$ from station B. The incoming signal corresponds to the ciphertext of the random number signal $R_B$ generated by random number generation element 20 and encryption element 22. The latter ciphertext is represented as $E(K_M,R_B)$. Decryption element 13 decrypts the incoming signal according to the symmetric key cryptosystem using master key $K_M$. The decryption is noted as $D(K_M,E(K_M,R_B))$ and produces random number signal $R_B$.

Station A is now in possession of two random number signals: the one it generated itself, $R_A$, and the one it received from station B, $R_B$. Similarly, station B is now in possession of the same random number signals as station A: the one it generated itself, $R_B$, and the one it received from station A, $R_A$.

Both random number signals $R_A$ and $R_B$ are supplied to combining function element 14 in station A. The combining element performs a commutative combination of the random number signals to generate the session key $K_S$. Commutative functions which are suitable for use in the combining element satisfy the condition $f(x,y)=f(y,x)$ where x and y are $R_A$ and $R_B$, respectively. Examples of such functions for use in combining element 14 are: linear functions such as addition and addition modulo 2; nonlinear functions such as multiplication and the sum of each variable raised to the same power which is greater than or equal to 2; and one way functions using encryption such as $E(K_M,R_A+R_B)$ or $E(R_A,R_B)+E(R_B,R_A)$.

It is conceivable that $R_A$ and $R_B$ could be equal. This may or may not lead to a trivial session key depending on the actual function used in combining element 14. In order to avoid such an occurrence, comparing element 16 is used to check whether the random number signals are different. If the signals are different, then the combining element is allowed to process the random number signals. If the signals are the same, then it may be desirable to signal the remote station via a protocol and request a new ciphertext transmission of the random signal.

Figure 2:
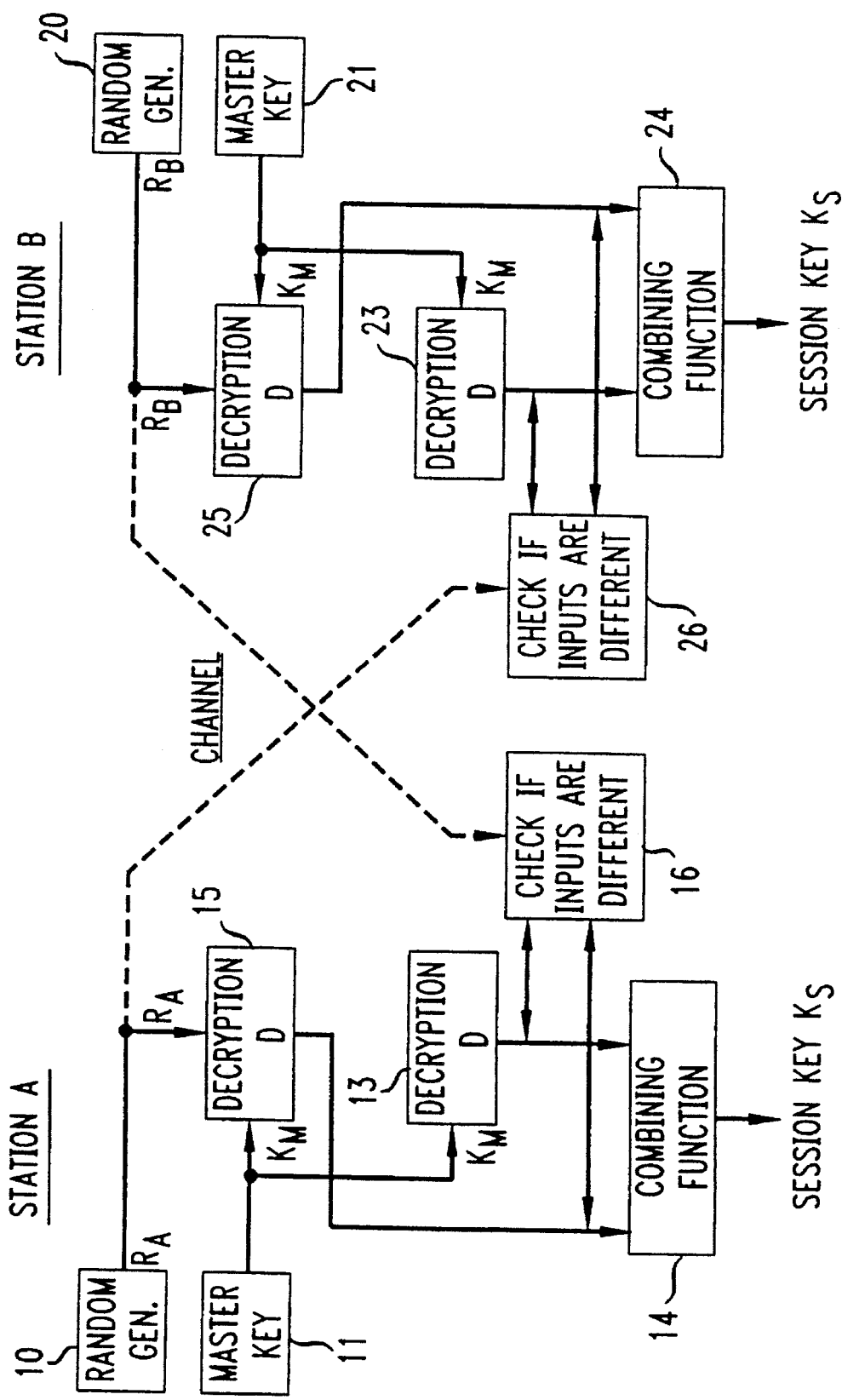

FIG. 2 shows an alternative embodiment of the secure session key generation system shown in FIG. 1. In this FIG., elements having the same reference numbers as shown in FIG. 1 are identical to those element. The system shown for station A comprises random number generating element 10, master key element 11, decryption elements 13 and 15, combining element 14, and comparing element 16.

For the system in FIG. 2, station A forms random number signal $R_A$ from random number generation element 10 and transmits that signal to station B. The random number signal $R_A$ is treated as a ciphertext message and supplied to decryption element 15. In a similar manner, station B forms random number signal $R_B$ from random number generation element 20 and transmits that signal to station A. Upon reception by station A, the received random number signal $R_B$ is treated as a ciphertext message and supplied to decryption element 13.

Decryption element 15 is a symmetric key cryptosystem which responds to the random number signal $R_A$ and the master key $K_M$ to form the plaintext $D(K_M,R_A)$. Also, decryption element 13 is a symmetric key cryptosystem which responds to the random number signal $R_B$ and the master key $K_M$ to form the plaintext $D(K_M,R_B)$. Both plaintext signals are supplied to combining element 14. Combining function 14 accepts both plaintext signals $D(K_M,R_A)$ and $D(K_M,R_B)$ to generate the session key. Comparing element 16 operates as described earlier to determine whether the plaintext signals are the same or different.

The embodiment shown in FIG. 1 produces a session key which depends only on the random signals $R_A$ and $R_B$. In the second embodiment (FIG. 2), the session key depends not only on the random number signals $R_A$ and $R_B$ but also on the master key.

The new methods presented here have a number of desirable properties:

each station contributes a random input which will influence the common session key;

preventing decryption of previous message transmissions;

no need for counters, clocks, timers, time stamps, tables, etc.;

no record keeping of any sort is required; and there is only a soft limit to the number of sessions keys derivable from a specific master key; an increasing number will increase the probability of a potential duplication of an earlier key (so-called "birthday problem") but, in practice, this probability can be kept extremely low.

What is claimed is:

1. A method of generating a cryptographic session key for a first symmetric key cryptosystem based on a known master key signal available to at least first and second parties, the method comprising the steps of:

forming a first random number signal by a first random number generation element;

receiving into a decryption element an incoming signal from one of said parties;

decrypting the incoming signal using a second symmetric key cryptosystem based on the master key signal to recover a second random number signal; and generating in a combining element said cryptographic session key by commutatively combining at least the first and second random number signals.

2. The method as defined in claim 1, wherein the step of generating the cryptographic session key includes the step of comparing the first and second random number signals in a comparing element to determine whether the random number signals are different from one another.

3. The method as defined in claim 2 wherein the generating step further includes proceeding with generation of the cryptographic session key only when the first and second random number signals differ from one other.

4. The method as defined in claim 1, further including the steps of forming an outgoing signal by encrypting the first random number signal in an encryption element using a third symmetric key cryptosystem based on the master key signal and transmitting the outgoing signal to one of the parties.

5. The method as defined in claim 4, further including the steps of:

forming the incoming signal by encrypting the second random number signal using a fourth symmetric key cryptosystem based on the master key signal;

transmitting the incoming signal to one of said parties;

decrypting the outgoing signal using a fifth symmetric key cryptosystem based on the master key signal to recover the first random number signal; and generating said cryptographic session key by commutatively combining at least the first and second random number signals.

6. The method as defined in claim 5 wherein the steps of generating the cryptographic session key each include the step of comparing the first and second random number signals to determine whether the random number signals are different from one other.

7. The method as defined in claim 6 wherein the generating steps each further include proceeding with generation of the cryptographic session key only when the first and second random number signals differ from one other.

8. A method of generating a cryptographic session key for a first symmetric key cryptosystem based on a known master key signal available to at least first and second parties, the method comprising the steps of:

forming a first signal in a first decryption element by decrypting a first random number signal produced by a first random number generator element using a second symmetric key cryptosystem based on the master key signal;

receiving into a second decryption element a second random number signal from one of said parties;

decrypting the second random number signal in said second decryption element using a third symmetric key cryptosystem based on the master key signal;

receiving into a second decryption element a second random number signal from one of said parties;

decrypting the second random number signal in said second decryption element using a third symmetric key cryptosystem based on the master key signal to form a second signal; and generating in a combining element said cryptographic session key by commutatively combining at least the first and second signals.

9. The method as defined in claim 8, wherein the step of generating the cryptographic session key includes the step of comparing the first and second signals in a comparing element to determine whether the first and second signals are different from one another.

10. The method as defined in claim 9 wherein the generating step further includes proceeding with generation of the cryptographic session key only when the first and second signals differ from one other.

11. The method as defined in claim 8 further including the steps of forming the first random number signal and transmitting the first random number signal to one of the parties.

12. The method as defined in claim 11 further including the steps of:

forming the second random number signal;

forming the second signal by decrypting the second random number signal using a fourth symmetric key cryptosystem using the master key signal;

transmitting the second random number signal to one of said parties;

decrypting the first random number signal using a fifth symmetric key cryptosystem using the master key signal to form the first signal; and generating said cryptographic session key by commutatively combining at least the first and second random number signals.

13. The method as defined in claim 12 wherein the steps of generating the cryptographic session key each include the step of comparing the first and second signals to determine whether the first and second signals are different from one other.

14. The method as defined in claim 13 wherein the generating steps each further include proceeding with generation of the cryptographic session key only when the first and second signals differ from one other.

15. The method as defined in claim 8, wherein said first decryption element and said second decryption element are one of the same decryption element and different decryption elements.

* * * * *